US010633769B2

(12) United States Patent
Torres Martinez

(10) Patent No.: US 10,633,769 B2
(45) Date of Patent: Apr. 28, 2020

(54) METHOD FOR PRODUCING FILAMENTS OF POLYACRYLONITRILE AND EXTRUSION HEAD FOR CARRYING OUT SAID METHOD

(71) Applicant: Manuel Torres Martinez, Pamplona (ES)

(72) Inventor: Manuel Torres Martinez, Pamplona (ES)

(*) Notice: Subject to any disclaimer, the term of this patent is extended or adjusted under 35 U.S.C. 154(b) by 237 days.

(21) Appl. No.: 15/536,450

(22) PCT Filed: Dec. 14, 2015

(86) PCT No.: PCT/ES2015/070898
§ 371 (c)(1),
(2) Date: Jun. 15, 2017

(87) PCT Pub. No.: WO2016/097441
PCT Pub. Date: Jun. 23, 2016

(65) Prior Publication Data
US 2018/0002834 A1  Jan. 4, 2018

(30) Foreign Application Priority Data
Dec. 19, 2014  (ES) .................................. 201431881

(51) Int. Cl.
*D01F 6/18*  (2006.01)
*D01D 1/06*  (2006.01)
*D01D 1/10*  (2006.01)
*B29C 48/05*  (2019.01)
*B29C 48/30*  (2019.01)
*B29C 48/14*  (2019.01)
*B29C 48/345*  (2019.01)
*B29B 7/36*  (2006.01)
(Continued)

(52) U.S. Cl.
CPC .................. *D01F 6/18* (2013.01); *B29B 7/36* (2013.01); *B29C 48/05* (2019.02); *B29C 48/143* (2019.02);
(Continued)

(58) Field of Classification Search
CPC ....................................... D01D 5/06
See application file for complete search history.

(56) References Cited

U.S. PATENT DOCUMENTS 2,945,282 A  4/1956 Freiberger
3,647,330 A * 3/1972 Hann ....................... D01D 5/20
425/76
(Continued)

FOREIGN PATENT DOCUMENTS

CN  102794896 A  11/2012
EP  1961847 A1  8/2008
(Continued)

OTHER PUBLICATIONS

International Search Report dated Feb. 17, 2016 for PCT/ES2015/070898 and English translation.
(Continued)

*Primary Examiner* — Robert A Vetere
(74) *Attorney, Agent, or Firm* — Lucas & Mercanti, LLP

(57) ABSTRACT

A method for producing filaments of polyacrylonitrile and an extrusion head for carrying out said method are provided, wherein the method comprises preparing a polyacrylonitrile polymer solution and passing said solution through an extruder plate that determines the formation of filaments, a central chamber being defined between the extruder plate and a floating plate connected to a vibrating system, said chamber being surrounded by a peripheral chamber into which the polymer solution is introduced under pressure. The polymer solution then passes through to the central
(Continued)

chamber via small radial conduits that accelerate the material, and is subjected to vibration in the central chamber before passing through the extruder plate.

5 Claims, 4 Drawing Sheets

(51) Int. Cl.
    *B29C 48/92*     (2019.01)
    *D01D 4/00*     (2006.01)
    *B29C 48/88*     (2019.01)

(52) U.S. Cl.
    CPC ............ *B29C 48/30* (2019.02); *B29C 48/302* (2019.02); *B29C 48/345* (2019.02); *D01D 1/06* (2013.01); *D01D 1/103* (2013.01); *B29C 48/919* (2019.02); *B29C 48/92* (2019.02); *B29C 2948/92704* (2019.02); *D01D 4/00* (2013.01)

(56) References Cited

U.S. PATENT DOCUMENTS

2013/0264733 A1    10/2013    Ichikawa et al.
2013/0292860 A1*   11/2013    Fujiki .................. B01D 69/085
                                                               264/13

FOREIGN PATENT DOCUMENTS

| GB | 737222 | 9/1955 |
| GB | 936758 | 9/1963 |
| KR | 101336792 B1 | 12/2013 |
| WO | 2013014576 A1 | 1/2013 |
| WO | 2013050777 A1 | 4/2013 |

OTHER PUBLICATIONS

Written Opinion dated Feb. 17, 2016 for PCT/ES2015/070898.
Translation of Written Opinion dated Feb. 17, 2016 for PCT/ES2015/070898.

* cited by examiner

METHOD FOR PRODUCING FILAMENTS OF POLYACRYLONITRILE AND EXTRUSION HEAD FOR CARRYING OUT SAID METHOD

CROSS REFERENCE TO RELATED APPLICATIONS

This Application is a 371 of PCT/ES2015/070898 filed on Dec. 14, 2015, which, in turn, claimed the priority of Spanish Patent Application No. P201431881 filed on Dec. 19, 2014, both applications are incorporated herein by reference.

TECHNICAL FIELD

The present invention relates to producing filaments of polyacrylonitrile (PAN), the main precursor for producing carbon fiber, proposing a method and a head for the formation of filaments of polyacrylonitrile by extrusion and applying vibration, thereby making it easier to extrude the material under conditions that improve the formation and the features of the filaments that are obtained.

STATE OF THE ART

The process of producing filaments of polyacrylonitrile (PAN), which is the main precursor of carbon fiber, generally consists of a polymerization phase, treating the product to turn the PAN polymer into pellets, preparing a solution and a spinning phase. During the spinning phase, the material is extruded from the prepared solution, forming filaments which then pass through a coagulating step to form with said filaments tows that pass through one or more drawing steps, a washing step, and a drying step, to finally be taken up on a reel.

The PAN polymer is formed, starting from the acrylonitrile (AN) monomer, by polymerizing free radicals in aqueous suspension; using a solvent to obtain a precipitated polymer in which the polymer is soluble; the polymer optionally being able to comprise other components in addition to AN, such as acrylic acid or itaconic acid, but if the PAN polymer is going to be used as a carbon fiber precursor, the presence of said other components should be limited as much as possible. However, the addition of said components provides better processability in future steps and it is necessary.

According to the current state of the art, filaments of polymer can be produced by means of several spinning methods, such as melt spinning or extruding the molten polymer; dry spinning or extruding the solution consisting of the polymer and the solvent in an environment where the solvent evaporates and the polymer sets due to the circulation of hot air; wet spinning or extruding the solution consisting of the polymer and a liquid, which can be organic or inorganic, in a coagulating medium; or dry-jet wet spinning or extruding the polymer solution in an air gap, followed by a coagulation bath, for the purpose of favoring molecule orientation before coagulation. Out of all of said methods, wet spinning and dry-jet wet spinning are the most widely used methods in the industry.

All the preceding methods involve pumping the polymer solution through small holes in a plate referred to as a spinneret, such that when the polymer solution passes through said holes, non-coagulated filaments of polyacrylonitrile are formed. The diameter of the extrusion holes is usually comprised between 40 and 60 microns, whereas the filaments that are obtained after extrusion usually have a diameter between 60 and 120 microns. One of the reasons the filaments have a larger diameter than the holes in which they are formed is that the polymer expands after extrusion, acquiring an "onion" shape, which increases the final diameter.

The wet spinning process for spinning filaments of PAN begins by dissolving the PAN polymer in a polar solvent, such as dimethylformamide or aqueous sodium thiocyanate, the proportion of the PAN polymer typically being between 10% and 30% by weight. The molecular weight of the PAN polymer is in the range of 70000-200000, chosen such that a viscosity providing a good compromise between the drawing and the final properties of the fiber is obtained.

Coagulation is the process that takes place once the polymer solution has passed through extrusion for forming filaments, the filaments usually being taut within the coagulating medium in order to obtain molecular alignment. The coagulating medium usually contains a solvent (the same solvent as for the PAN solution) and non-solvent (generally water) mixture, such that filaments of PAN polymer in gel state, the molecules of which can be readily oriented by means of drawing, are obtained by using a suitable solvent concentration and a low temperature; whereas depending on the rate of coagulation, the filaments acquire one shape or another, wherein the rate of formation of said filaments must be slow in order to obtain a suitable circular shape.

The main objective of drawing the polymer is to orient the fiber structure in the longitudinal direction of the filaments as much as possible, which increases the rigidity and mechanical tensile strength of the resulting filaments because the crystallinity of the molecular structure increases during drawing. It is therefore necessary to apply tension when producing the filaments for the purpose of drawing them in order to achieve suitable orientation of the molecules of the fiber.

According to said concepts there are a number of known solutions for producing filaments of PAN polymer, including, for example:

Patent document EP 1961847 discloses a process for the production of filaments of PAN polymer, wherein said process comprises spinning the polymer by means of either wet spinning or dry-jet wet spinning, with at least two drawing phases.

Patent document GB 737222 discloses a method of extrusion of a PAN polymer solution for obtaining filaments, wherein said solution is extruded into an evaporative medium through which the filaments travel and gradually lose their solvent content, going through several drawing phases after that.

Patent document GB 936758 discloses a method and apparatus for wet spinning filaments of PAN polymer after a polymer extrusion process through a spinneret having 100 holes, with an extrusion ratio of 3.1 cc/min.

Patent document WO 2013/050777 discloses a method of obtaining a PAN polymer based on the use of an organogel as a precursor, containing not only polyacrylonitrile but also a nucleophilic polymer, and a dry-jet wet spinning process; wherein the PAN polymer is subjected to two drawing processes, one during coagulation and the other after drying by passing through heating blocks and rollers.

Patent document US 2013/0264733 discloses a method for producing filaments of PAN polymer, with a hot drawing process by means of rollers, after drying, which replaces conventional drawing in an overheated steam chamber.

Patent document WO 2013/014576 discloses a method for producing filaments of PAN polymer, comprising a first PAN polymer spinning step and a second fiber oxidation/carbonization step, said steps being performed in line and continuously, wherein the speed of the first step is low in order to correctly pass the fiber on to the second oxidation/carbonization step.

However, none of these solutions incorporates a system capable of reducing the pressures needed in extrusion, making it easier to eliminate the microbubbles present in the polymer mass being extruded, and favoring orientation of the molecules in the direction of the axis of the filaments which are obtained from extrusion. In addition, in all those solutions more than one drawing phase is required for drawing the filaments of polyacrylonitrile, thereby making them complex and expensive processes.

OBJECT OF THE INVENTION

The present invention proposes a method and a head for producing filaments of polyacrylonitrile (PAN) by means of extruding the PAN polymer and applying vibration to the polymer to be extruded, wherein said polymer is introduced into the extrusion phase under laminar flow conditions through an acceleration step favoring orientation of the molecules in the extrusion direction.

The extrusion head has an extruder plate provided with calibrated holes for forming filaments when the polymer passes through the holes, a chamber being defined between said extruder plate and a floating plate held by means of elastic membranes and connected to a vibrating device, said chamber communicating, through a distribution of small radial conduits, with a peripheral chamber into which an inlet for introducing the polymer solution under pressure opens.

A system is thereby obtained in which the vibration that is applied to the polymer solution in the chamber before the extruder plate determines, on one hand, that the heavier particles of the material move in the direction opposite the source of the vibration, whereas the lighter particles, such as air bubbles, move towards the source of the vibration, which means that the air bubbles separate from the material of the polymer, making it easier to eliminate said air bubbles, such that the resulting material used to form the filaments upon passing through the extruder plate has fewer defects due to air contained therein.

In addition, the vibration makes it easier for the polymer solution to pass through the extruder plate, reducing the necessary pressure, which translates into an improvement in the filaments that are obtained from extrusion since they expand less at the outlet of the extrusion holes after they are compressed in the preceding step, maintaining a diameter that is more similar to the diameter of said extrusion holes.

Additionally, the vibration also favors alignment of the polymer molecules in the direction of the axis of the filaments resulting from extrusion, which is one of the main objectives of drawing the filaments, and thereby allowing a drop in the number of drawing operations required. To obtain this improvement in molecule orientation, prior vibration helps to prepare the structure of the material of the polymer solution, weakening its molecules.

The holes of the extruder plate have a diameter between 100 and 120 microns, so a lower pressure is required for extrusion with vibration, and the expansion of the filaments upon exiting said extrusion holes is further reduced, thereby also favoring the molecules of the precursor material remaining well-oriented, without sustaining deviations when the filament is expanded. Additionally, the vibrating system improves homogeneity of the mixture throughout all of the mass of the polymer solution, and therefore between the filaments produced, which allows obtaining more homogenous sections in the filaments.

The polymer solution passes through the extruder plate at high speed, thereby improving production line efficiency, while at the same time said high speed also favors alignment of the molecules and the drawing of the polymer; costs therefore are lower and productivity higher.

Therefore, the method and the head of the invention help to obtain features making this system advantageous for producing filaments of polyacrylonitrile by means of extruding a polymer solution, being novel and preferred with respect to conventional systems for the same application.

DETAILED DESCRIPTION OF THE INVENTION

Figure 1:
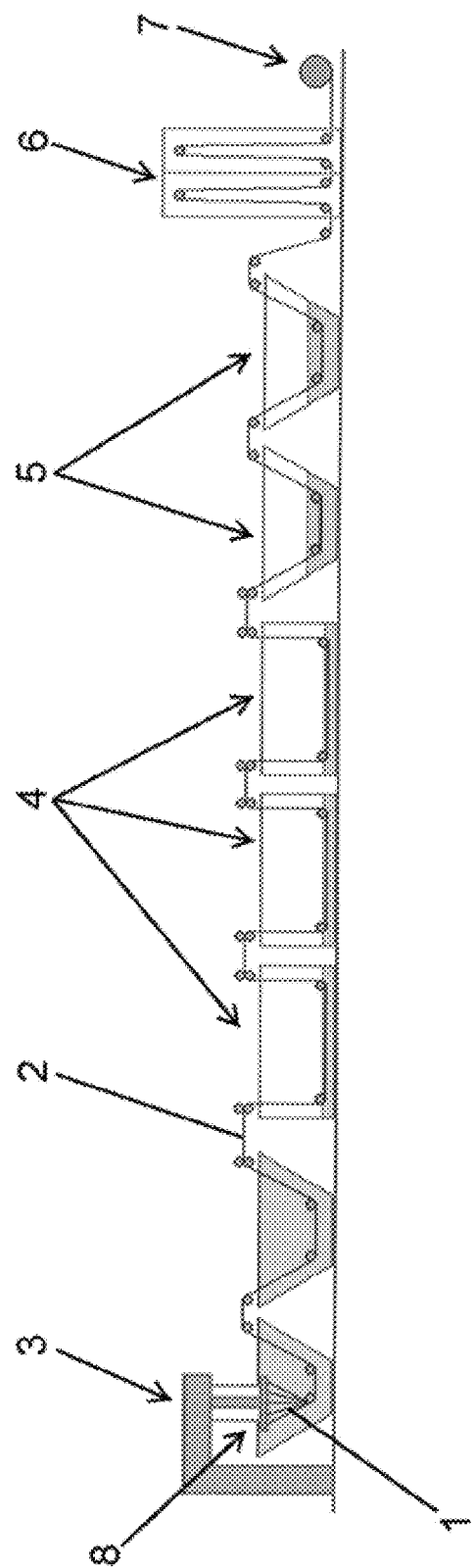
FIG. 1 shows a production line for producing filaments of polyacrylonitrile, with the system for producing filaments object of the invention.

The object of the invention relates to a system for forming filaments (1) of polyacrylonitrile (PAN), in order to produce tows (2) with the filaments (1) of polyacrylonitrile, in an installation, such as the one shown in FIG. 1, comprising a formation and coagulation phase (3) for the formation and coagulation of the filaments (1), one or more drawing phases (4) for drawing the tows (2) formed from the filaments (1), one or more washing phases (5), a drying phase (6), and a take-up reel (7) for taking up the obtained tows (2).

Figure 2:
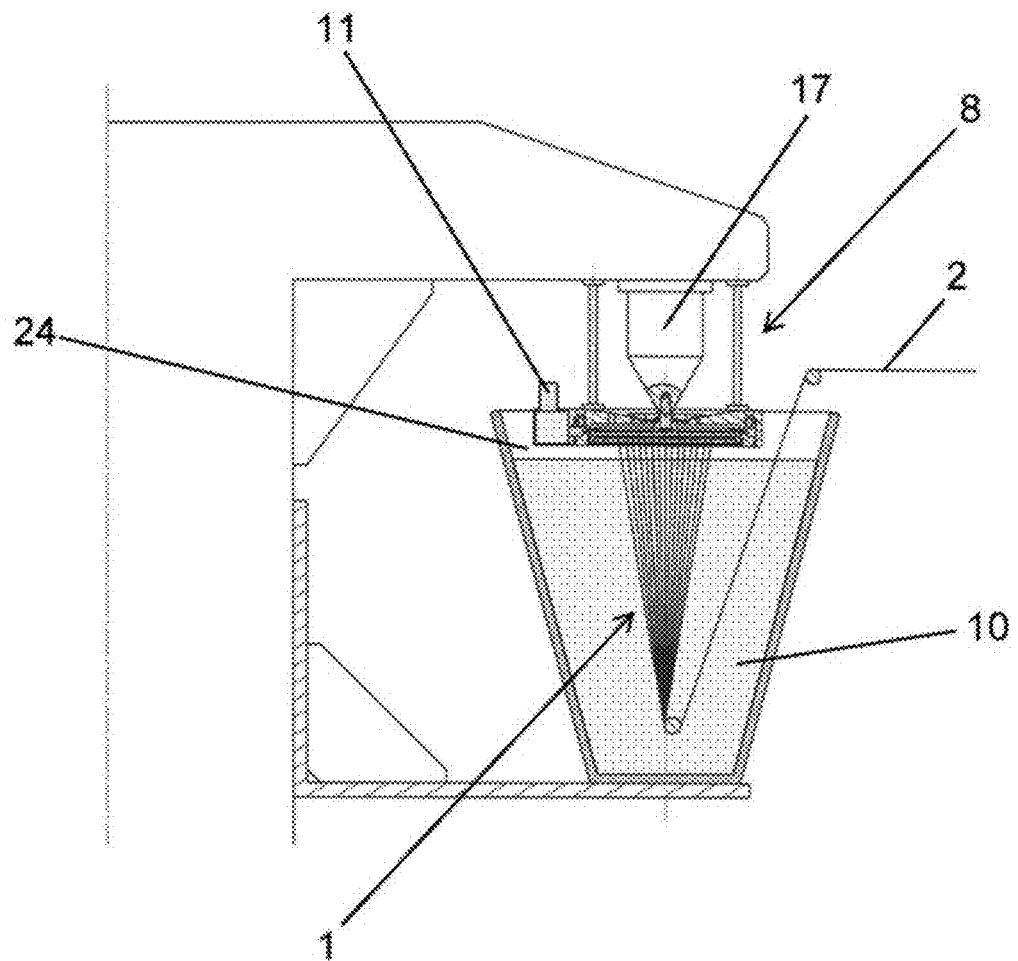
FIG. 2 shows an enlarged cross-section view of the phase for producing filaments of polyacrylonitrile according to the invention.
Figure 3:
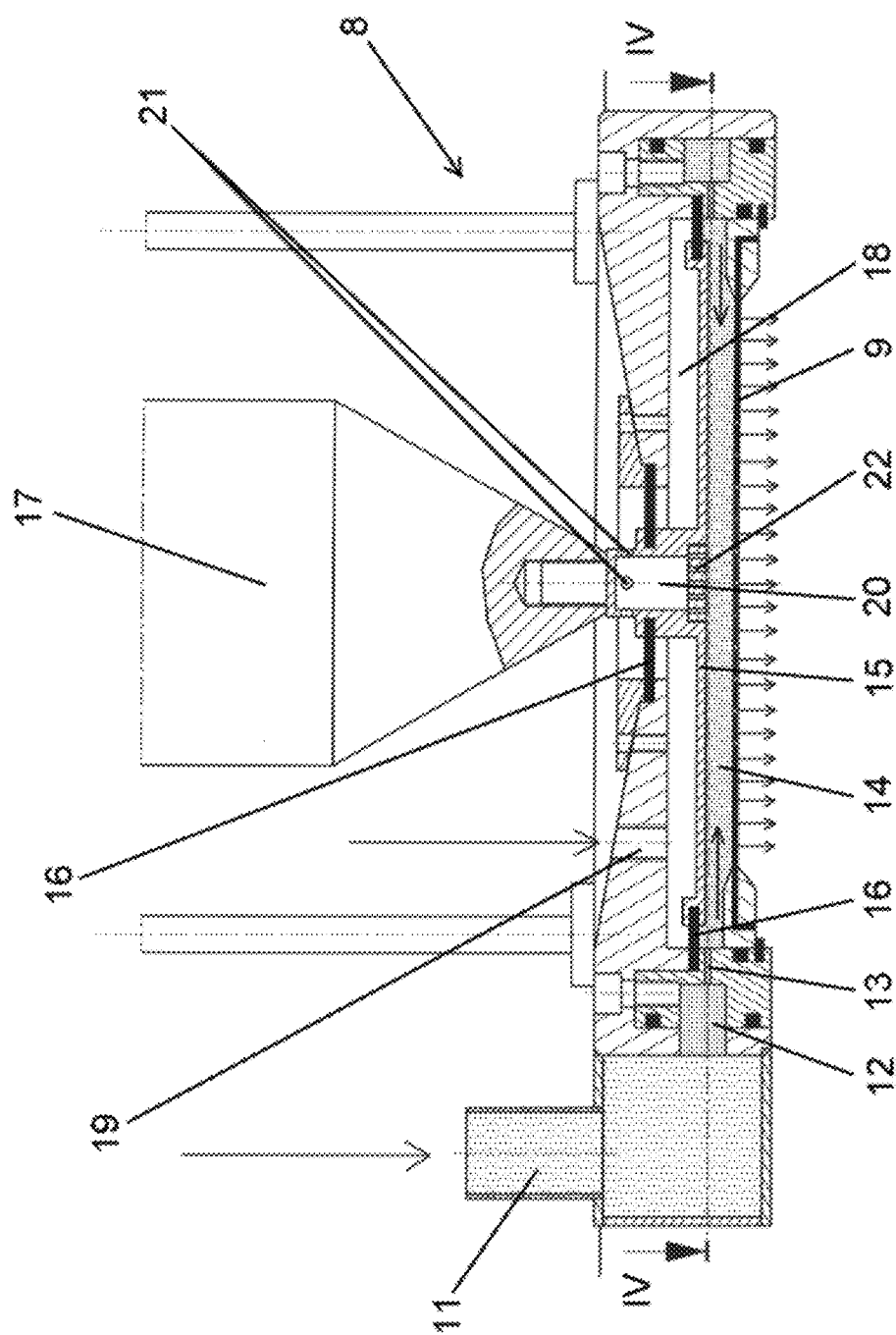
FIG. 3 is an enlarged cross-section view of the head for producing filaments of polyacrylonitrile according to the invention.
Figure 4:
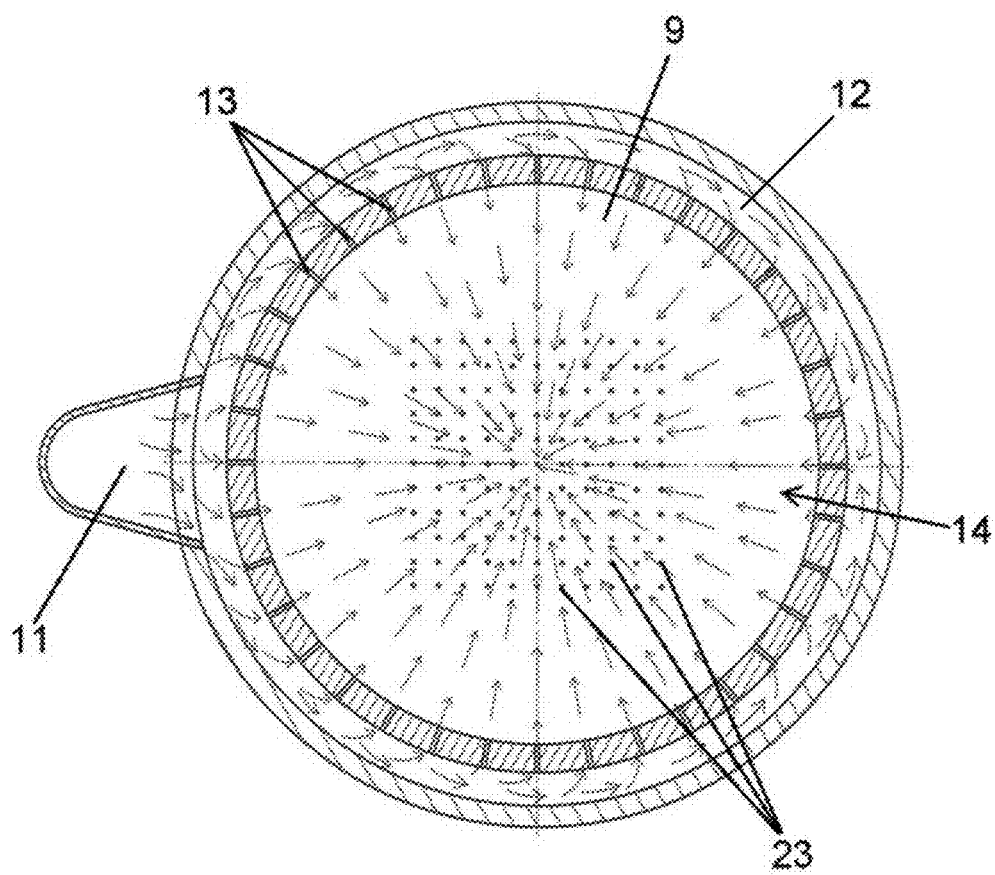
FIG. 4 is a view according to section IV-IV indicated in FIG. 3.

Before forming the filaments (1), PAN polymer solution is prepared and introduced under pressure in a head (8) wherein the filaments (1) are formed by passing the polymer solution through an extruder plate (9), said filaments (1) then passing into a coagulating medium (10) where a group of filaments (1) are brought together in order to form a tow (2), as seen in FIG. 2.

The head (8) has an inlet (11) through which the PAN polymer solution is introduced under pressure, said solution reaching a peripheral chamber (12) from where it enters, via small radial conduits (13), a central chamber (14) defined between the extruder plate (9) and a floating plate (15) which is held by means of elastic membranes (16) and connected to a vibrating system (17), preferably an ultrasound vibrating system, by means of a piezoelectric device formed by a high-frequency sonotrode, without this embodiment being limiting.

A back pressure chamber (18) is furthermore defined above the floating plate (15), into which chamber (18) air is introduced under pressure through an inlet (19); the vibrating system (17) is connected to the floating plate (15) in the middle area, wherein said floating plate (15) forms a cavity (20) communicated with the exterior through holes (21), a filter (22) being arranged between said cavity (20) and the central chamber (14).

This being the case, the PAN polymer solution that is introduced under pressure through the inlet (11) reaches the peripheral chamber (12) through which it is distributed, passing through the radial conduits (13) into the central chamber (14), from where it exits through the extruder plate (9) which is provided with a distribution of calibrated holes (23) measuring between 100 and 120 microns in diameter and determining the formation of the filaments (1).

The vibrating system (17) produces a vibrating operation of the floating plate (15), which exerts an action on the material of the polymer solution in the central chamber (14), which causes the micro-air bubbles to separate towards the source of the vibration, being eliminated, together with part of the solvent of the solution, through the filter (22) which allows the passage of the air bubbles and solvent, but not the material of the polymer.

Furthermore, the vibration allows reducing the pressure required for extruding the polymer solution through the holes (23) of the extruder plate (9), and it favors alignment of the molecules of the material in the axial direction of the filaments (1) that are formed, while the pressure of the back pressure chamber (18) offsets the pressure of the fluid material of the solution, reducing the load of the vibrating system (17).

In addition, the extruder plate (9) has a plane configuration, which favors pressure being the same on the entire extrusion surface, which is an important requirement for the flow rate of the material being extruded to be homogenous and for the resulting filaments (1) to have identical features.

Furthermore, the vibrating system allows increasing concentration homogeneity in the polymer solution, which leads to greater homogeneity in the material extruded through each of the holes (23), meaning that each of the filaments (1) contains the same amount of polymer and that the sections of the generated filaments (1) are more homogenous once they have been treated.

The radial conduits (13) furthermore accelerate the material in the passage from the peripheral chamber (12) to the central chamber (14), thereby determining a laminar flow of the material towards the middle area of said central chamber (14) under conditions which in turn favor the elimination of micro-air bubbles and the alignment of the molecules of the material in the formation direction of the filaments (1) through the extruder plate (9).

Use of vertical dry-jet wet spinning method is preferably envisaged, whereby the filaments (1) that are formed are cooled in the passage through an air gap (24) before the coagulating medium (10), wherein the high tensions that are generated in the passage through the extrusion holes (23) are reduced. In addition, the material passing through the extrusion holes (23) is made to have a higher polymer concentration, filaments (1) having better properties being obtained.

The final shape of the section of the filaments (1) is determined in the coagulating medium (10), depending on process speed, such that to obtain a suitable circular section, the speed must be slow, while the extruded material is subjected to tensions in the coagulating medium (10) that favor alignment of the molecules.

The invention claimed is:

1. An extrusion head for producing filaments of polyacrylonitrile, comprising an inlet for introducing a polyacrylonitrile polymer solution under pressure and an extruder plate provided with calibrated holes for forming filaments of the polymer solution by making said solution pass through said extruder plate, wherein a central chamber is defined between the extruder plate and a floating plate, there being arranged around said central chamber a peripheral chamber into which the inlet opens, said peripheral chamber being communicated with the central chamber via small radial conduits, whereas a vibrating system is arranged connected to the floating plate.

2. The extrusion head according to claim 1, wherein the floating plate is held by elastic membranes.

3. The extrusion head according to claim 1, wherein a back pressure chamber provided with an inlet for introducing air under pressure therein is defined above the floating plate.

4. The extrusion head according to claim 1, wherein the vibrating system is connected to the floating plate in the middle area, where said floating plate forms a cavity communicated with the exterior through holes, a filter being arranged between said cavity and the central chamber.

5. The extrusion head according to claim 1, wherein the holes of the extruder plate have a diameter between 100 and 120 microns.

* * * * *